United States Patent
Achenbach et al.

(10) Patent No.: US 9,727,340 B2
(45) Date of Patent: Aug. 8, 2017

(54) HYBRID TAG SCHEDULER TO BROADCAST SCHEDULER ENTRY TAGS FOR PICKED INSTRUCTIONS

(71) Applicant: Advanced Micro Devices, Inc., Sunnyvale, CA (US)

(72) Inventors: Michael Achenbach, Austin, TX (US); Teik Tan, Austin, TX (US); Gregory W. Smaus, Austin, TX (US); Ganesh Venkataramanan, Sunnyvale, CA (US); Emil Talpes, San Mateo, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 688 days.

(21) Appl. No.: 13/944,302

(22) Filed: Jul. 17, 2013

(65) Prior Publication Data
US 2015/0026436 A1    Jan. 22, 2015

(51) Int. Cl.
*G06F 9/38* (2006.01)

(52) U.S. Cl.
CPC .......... *G06F 9/3836* (2013.01); *G06F 9/384* (2013.01); *G06F 9/3838* (2013.01)

(58) Field of Classification Search
CPC ....... G06F 9/3836; G06F 9/3838; G06F 9/384
See application file for complete search history.

(56) References Cited

U.S. PATENT DOCUMENTS

| | | | | |
|---|---|---|---|---|
| 5,930,491 A * | 7/1999 | Hilgendorf | ........... | G06F 9/3017 712/209 |
| 6,308,260 B1 * | 10/2001 | Le | .......... | G06F 9/3836 712/215 |
| 2003/0061467 A1 * | 3/2003 | Yeh | ........ | G06F 9/3836 712/217 |
| 2004/0123077 A1 * | 6/2004 | Shebanow | ............ | G06F 9/3836 712/217 |
| 2005/0120192 A1 * | 6/2005 | Akkary | ................... | G06F 9/384 712/220 |
| 2010/0250900 A1 * | 9/2010 | Brown | .................. | G06F 9/3838 712/208 |
| 2010/0257341 A1 * | 10/2010 | Brown | .................. | G06F 9/3838 712/216 |
| 2013/0042089 A1 * | 2/2013 | Vinh | ..................... | G06F 9/3836 712/205 |

(Continued)

OTHER PUBLICATIONS

U.S. Appl. No. 13/944,293, filed Jul. 17, 2013, entitled "Method and Apparatus for Differential Checkpointing".

(Continued)

*Primary Examiner* — Jacob A Petranek (57) ABSTRACT

The present invention provides a method and apparatus for scheduling based on tags of different types. Some embodiments of the method include broadcasting a first tag to entries in a queue of a scheduler. The first tag is broadcast in response to a first instruction associated with a first entry in the queue being picked for execution. The first tag includes information identifying the first entry and information indicating a type of the first tag. Some embodiments of the method also include marking at least one second entry in the queue is ready to be picked for execution in response to at least one second tag associated with at least one second entry in the queue matching the first tag.

20 Claims, 9 Drawing Sheets

(56) References Cited

U.S. PATENT DOCUMENTS

2013/0339679 A1* 12/2013 Iyer ..................... G06F 9/3851
                                                          712/225
2014/0040595 A1*  2/2014 Tran ..................... G06F 9/384
                                                           712/32

OTHER PUBLICATIONS

Non-Final Office Action mailed Jan. 21, 2016 for U.S. Appl. No. 13/944,293, 19 pages.
Notice of Allowance mailed Jun. 22, 2016, 16 pages.

* cited by examiner

HYBRID TAG SCHEDULER TO BROADCAST SCHEDULER ENTRY TAGS FOR PICKED INSTRUCTIONS

FIELD OF THE DISCLOSURE

This application relates generally to processing systems, and, more particularly, to tag schedulers for processing systems.

BACKGROUND

Processing systems such as central processing units (CPUs), graphical processing units (GPUs), and accelerated processing units (APUs) implement instruction pipelines to increase the number of instructions that can be executed in a particular time interval. A typical pipeline includes several pipeline stages such as an instruction fetch stage, a decode stage, an execution stage, a memory access stage, and a write-back stage. Instruction scheduling algorithms can be used to improve the overall pipeline throughput by optimizing the order or schedule of execution of instructions. For example, out-of-order instruction scheduling can be used to schedule instructions for execution in the pipeline in an order that is different than the program order of the instructions. Out-of-order instruction scheduling algorithms must account for potential data hazards related to dependencies between the different instructions. For example, a first instruction that writes a value to a register that is later read by a second instruction should generally be performed before the second instruction.

A conventional scheduler maintains a queue of entries that can be picked for scheduling. Each entry becomes ready and eligible to be picked for execution once all of its source registers are ready, e.g., the source registers are not waiting to be written by an older instruction. In the case of a dependent (child) instruction that accesses one or more source registers that are written by an older (parent) instruction, source registers for the child instruction are marked as ready in response to the parent instruction being picked for execution. For example, a picker may broadcast the read address of a RAM location that includes information identifying destination registers of the entry that has been picked for execution. The information may be referred to as a tag and typically includes the physical register number associated with the destination register of the picked instruction. The tag can be read out of the RAM location and compared to information identifying the source registers of entries in the queue. A match indicates that the corresponding source register is ready and the child instruction can be marked as ready and eligible when all of its source registers are marked as ready. However, reading out the tag from the RAM location takes time, which may impact critical path timing. Moreover, schedulers that use tags such as physical register numbers (PRN) that identify physical register entries may need to allocate a physical register to an instruction to track dependencies of the instruction even if the instruction does not use the physical register. This unnecessarily consumes the physical register and reduces the number of physical registers available for other instructions.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

FIGS. 1-10 disclose techniques for allowing pick logic in the scheduler to use identifiers of entries in a scheduler queue in the scheduler as tags. These tags may be referred to as a "scheduler entry" type of tag. The pick logic can then broadcast tags including the scheduler entry identifiers directly to the entries in the scheduler, which can mark any matching source registers as ready. The tag therefore bypasses the logic that is conventionally used to look up the physical register numbers of the destination registers in RAM when the pick logic in the scheduler broadcasts a tag that includes the address of the location in the RAM that includes information identifying destination registers of the entry that has been picked for execution. Bypassing the destination register lookup logic can improve critical path timing.

Some instructions may need to use other types of tags. For example, long latency instructions may use a "PRN" type of tag that includes the PRN of the physical register associated with the tag. Different types of tags may coincidentally include the same information (e.g., a scheduler entry identifier may match a PRN associated with a long latency instruction) and so the tags described herein include additional information that identifies the type of the tag that will be broadcast to the entries so that tags only match other tags of the same type. Schedulers that use embodiments of the tags that include tag type information may be referred to as hybrid tag schedulers because the scheduler can schedule instructions on the basis of different types of tags, e.g. tags that include scheduler entry identities or tags that include physical register numbers.

In some embodiments, the scheduler implements a feedback loop to determine when the instructions in entries of the scheduler queue are ready and eligible for execution. For example, when a first entry in a scheduler queue is picked for execution, pick logic feeds back a first tag identifying the first entry by broadcasting the first tag to comparators associated with the entries in the scheduler queue. The first tag also includes information identifying a type of the first tag. The comparators can then determine whether the first tag matches one or more second tags associated with one or more second entries in the scheduler queue. The second tags include information identifying entries in the scheduler queue that are associated with destination registers of older instructions that write to the source registers of the instructions associated with the second entries. Source registers corresponding to matching second tags my then be marked as ready and the second entry may be marked as ready to be picked when all of its source registers are marked as ready.

Some embodiments of the first and second entries may include a toggle bit that is inverted after the parent instruction is picked and the second tag has been broadcast. Inverting the toggle bit can prevent aliasing of the first tag with subsequent tags broadcast by other instructions that are allocated to the parent instruction's scheduler entry after the parent instruction has completed. For example, the toggle bit associated with the scheduler entry can be inverted after the tag in the scheduler entry has been broadcast so that the next time an instruction is allocated and picked from that particular scheduler entry, it can read this toggle bit and the toggle bit will have the opposite value to the value of the toggle bit prior the tag being broadcast by the previous pick of that same scheduler entry.

Figure 1:
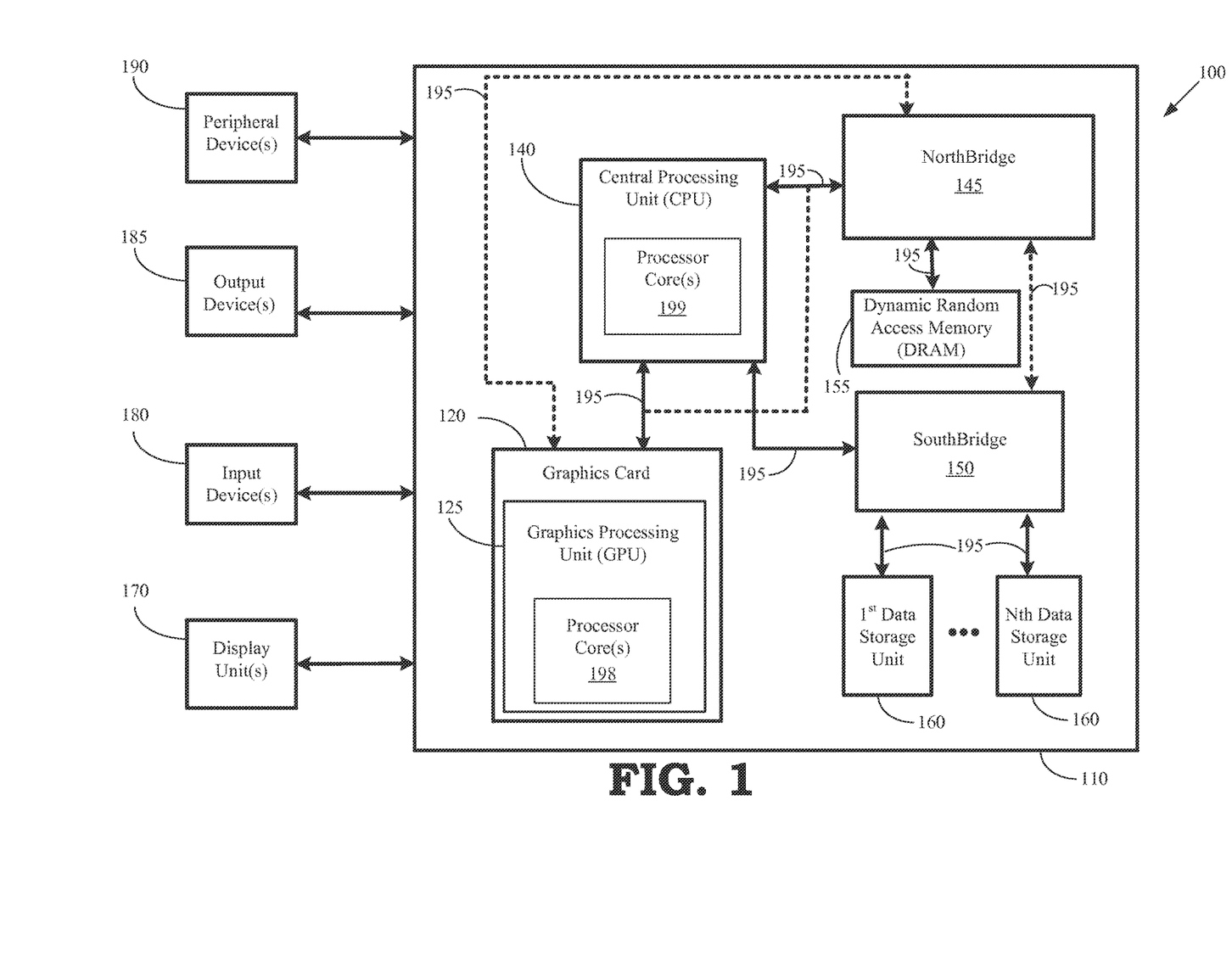
FIG. 1 is a block diagram of an example computer system, according to some embodiments.

FIG. 1 illustrates an example computer system 100, according to some embodiments. The computer system 100 may be a personal computer, a computing-enabled television, a laptop computer, a handheld computer, a netbook computer, a mobile device, a tablet computer, a computing-enabled cellular telephone, a personal data assistant (PDA), a server, a mainframe, a work terminal, or the like. The computer system 100 includes a main structure 110 which may include a motherboard, system-on-a-chip, circuit board or printed circuit board, a desktop computer enclosure or tower, a laptop computer base, a server enclosure, part of a mobile device, tablet, personal data assistant (PDA), or the like.

Some embodiments of the main structure 110 include a graphics card 120, which may contain a graphics processing unit (GPU) 125 used in processing graphics data. The computer system 100 shown in FIG. 1 also includes a central processing unit (CPU) 140 or other type of processor, which is coupled to a northbridge 145. Some embodiments of the graphics card 120 may be coupled to the CPU 140 via the northbridge 145 or some other electromagnetic or communicative connection. The northbridge 145 may be coupled to a system RAM 155 (e.g., DRAM) and in some embodiments the system RAM 155 may be coupled directly to the CPU 140. The system RAM 155 may be of any RAM type known in the on and the type of RAM 155 may be a matter of design choice. In some embodiments, the northbridge 145 may be connected to a southbridge 150, which may be connected to one or more data storage units 160. In one or more embodiments, the various components of the computer system 100 may be operatively, electromagnetically, or physically connected or linked with a bus 195 or more than one bus 195.

Some embodiments of the computer system 100 may be connected to one or more display units 170, input devices 180, output devices 185, or peripheral devices 190.

The GPU 120 and the CPU 140 shown in FIG. 1 may implement one or more processor cores 198, 199, respectively, for executing instructions. Some embodiments of the GPU 120 or the CPU 140 may implement four or more processor cores 198, 199 for processing four or more instructions in parallel. However, persons of ordinary skill in the art having benefit of the present disclosure should appreciate that the number of processor cores implemented in the GPU 120 or the CPU 140 is a matter of design choice. The processor cores 198, 199 implement a scheduler that can schedule instructions for out-of-order processing in one or more instruction pipelines. As discussed herein, logic in scheduler entries of dependent instructions monitor signals associated with previously picked instructions to determine when the dependent instructions are ready and eligible to be picked for execution in the instruction pipeline. For example, the scheduler may broadcast tags that identify destination registers of picked instructions; waiting dependent instructions can use the tags to mark the corresponding source registers as ready. Some embodiments of the scheduler include pick logic that broadcasts tags directly to the entries in the scheduler, which can then mark any matching source registers as ready. The tag therefore bypasses the logic that is conventionally used to look up the physical register numbers of the destination registers in the RAM using the address indicated in the tag, which relieves pressure on critical path timing.

Figure 2:
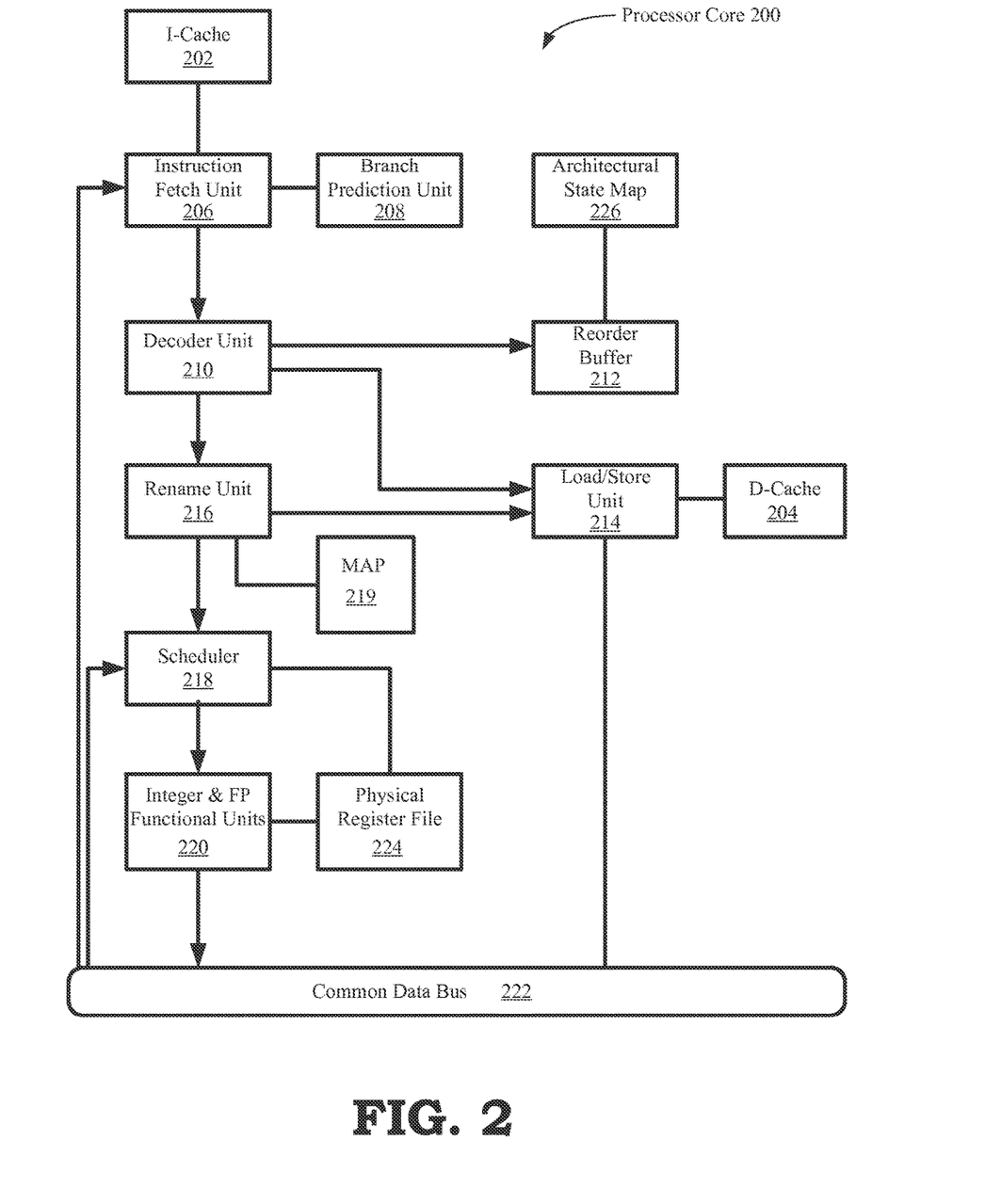
FIG. 2 is a block diagram of an example processor core that may be used to implement processor cores shown in FIG. 1, according to some embodiments.

FIG. 2 illustrates an example processor core 200 that may be used to implement processor cores 198, 199 shown in FIG. 1, according to some embodiments. Processor core 200 may include circuitry for executing instructions according to a predefined instruction set. The processor core 200 may be implemented in a single-processor configuration or in a multi-processor configuration. Some embodiments of the processor core 200 may be included in a multi-core configuration within a processing node of a multi-node system.

An instruction-cache (I-cache) 202 may store instructions for a software application and a data-cache (D-cache) 204 may store data used in computations performed by the instructions. The caches 202 and 204 may be implemented as a hierarchy of caches such as L1 and L2 cache structures. The processor core 200 includes an instruction fetch unit (IFU) 206 for fetching one or more instructions from the I-cache 202 per clock cycle. The IFU 206 may include a program counter (PC) register that holds a pointer to an address of the next instructions to fetch from the I-cache 202. A branch prediction unit 208 may be coupled to the IFU 206 and the branch prediction unit 208 may be configured to predict a branch or path taken following instructions that change the flow of an instruction stream, e.g., branch instructions or other conditional instructions.

A decoder unit 210 implemented in the processor core 200 decodes the opcodes of the fetched instructions. Some embodiments of the decoder unit 210 may divide a single instruction into two or more micro-operations (micro-ops). The micro-ops may be processed by subsequent pipeline stages and executed out-of-order. However, the micro-ops may not be committed until each micro-op corresponding to an original instruction is ready. As used herein, the processing of an "instruction" in core 200 may refer to the processing of the instruction as a whole or the processing of an individual micro-op comprised within the instruction. The decoder unit 210 may allocate entries in an in-order retirement queue, such as reorder buffer 212, in reservation stations, or in a load/store unit 214. In the embodiment shown, a reservation station may comprise the rename unit 216 and the scheduler 218, which are shown as separate units. Scheduler entries or reorder buffer entries are temporary holding locations that expire on instruction completion (for scheduler entries) or on retirement (for reorder buffer entries). The flow of instructions from the decoder unit 210 to the allocation of entries in the rename unit 216 may be referred to as dispatch. The rename unit 216 may be configured to perform register renaming for the fetched instructions.

Register renaming may facilitate the elimination of certain dependencies between instructions (e.g., write-after-read or "false" dependencies), which may in turn prevent unnecessary serialization of instruction execution. In one embodiment, rename unit 216 may be configured to rename the logical (e.g., architectural) destination registers specified by instructions by mapping them to a physical register space, resolving false dependencies in the process. Once decoded and renamed, instructions may be ready to be scheduled for execution. Scheduling an instruction for execution may be referred to as "picking" the instruction to be executed.

The scheduler 218 may implement a queue where instructions are stored in entries to wait until their operands become available in corresponding source registers. When operands are available and hardware resources are also available, an instruction may be picked for execution and issued from the scheduler 218 to the integer and floating-point functional units 220 or the load/store unit 214. The functional units 220 may include arithmetic logic units (ALUs) for computational calculations such as addition, subtraction, multiplication, division, and square root. Logic may be included to determine an outcome of a branch instruction and to compare the calculated outcome with the predicted value. If there is not a match, a mis-prediction or mis-speculation occurred, and the subsequent instructions after the branch instruction need to be removed and a new fetch with the correct PC value needs to be performed.

The processor core 200 also includes mapping logic (MAP) 219 that stores information reflecting the relationship between architectural registers and the physical registers, scheduler entries, or reorder buffer entries to which they are mapped. Information identifying the physical register, scheduler entry, or reorder buffer entry associated with an architectural register may be used to generate a tag or a portion of a tag. The rename unit 216 is communicatively coupled to the mapping logic 219 and may use the information stored in the mapping logic 219 to track the architectural registers and their associated tags. The mapping logic 219 may also include other information used to track types of the tags that are associated with the architectural registers.

Some embodiments of the tags include fields for holding information identifying the tag type associated with the architectural register. The tag type indicates the kind of information that is used to create the tag. For example, an instruction that references an architectural register X may be allocated a physical register (Px), a scheduler entry (Sx), and/or a reorder buffer entry (Rx). A tag for the instruction may therefore be associated with a PRN type if the tag includes information identifying the physical register number of Px, a QID type if the tag includes information identifying the scheduler entry Sx, or an ROB type if the tag includes information identifying the reorder buffer entry Rx. For example, if the instruction has been allocated scheduler entry Sx, the mapping logic 219 can include information that maps Px and Sx to the architectural register X. The mapping logic 219 may also store an additional bit to indicate the tag type. For example, the additional bit may indicate that the tag type is QID and so dependents of this instruction should look for a tag broadcast of Sx (until the instruction is complete) to determine eligibility of their operands. The dependent instructions may compare broadcast values of tags to values of Sx associated with their source registers to determine when it should wake up, as discussed herein.

In some cases, a younger instruction may allocate to the same scheduler entry Sx that was occupied by an older instruction that has completed. The older instruction is still associated with an old tag that represents the scheduler entry that the older instruction was occupying. However, the scheduler entry was deallocated when the older instruction completed. If a dependent instruction of the older instruction picks up the Sx tag that was subsequently allocated to a different, younger instruction, the dependent instruction of the older instruction may detect a match with the new Sx tag on the pick of the younger instruction. This could cause functional problems in some embodiments of the scheduler 218. The tag type bit may therefore be used to prevent instructions from erroneously responding to repeated transmissions of the same tag. For example, when a first instruction is picked, the pick logic in the scheduler 218 may broadcast the first instruction's tag (Sx) to wake up its dependents. When the first instruction is fully complete, the tag type bit in the mapping logic 219 may be flipped (e.g., from tag type QID to tag type PRN) to indicate that dependents of register X should pick up the physical register tag (Px) instead of the scheduler entry tag (Sx). At this point, dependent instructions should see that their operand is ready and shouldn't expect to need to see Sx broadcast again. However, switching the tag type bit guarantees that the first instruction doesn't pick up the old Sx tag because the old Sx tag now has a different value of the tag type bit than the tag type bit stored in the mapping logic 219.

Results from the functional units 220 or the load/store unit 214 may be presented on a common data bus 222. The results may be sent to the reorder buffer 212 where the instruction receives its results and may be marked for retirement. Instructions at the head-of-the-queue may have their results written to the appropriate physical registers in a physical register file 224. The processor core 200 may also include an architectural state map 226 that maps the logical or architectural register numbers to the associated physical register numbers that indicate the physical registers in the physical register file 224. The architectural state of the general-purpose registers of processor core 200 may therefore be represented by the architectural state map 226 and the contents of the physical register file 224. Instructions in the reorder buffer 212 may be retired in-order and the head-of-queue pointer may be adjusted to the subsequent instruction in program order as each instruction is retired.

Figure 3:
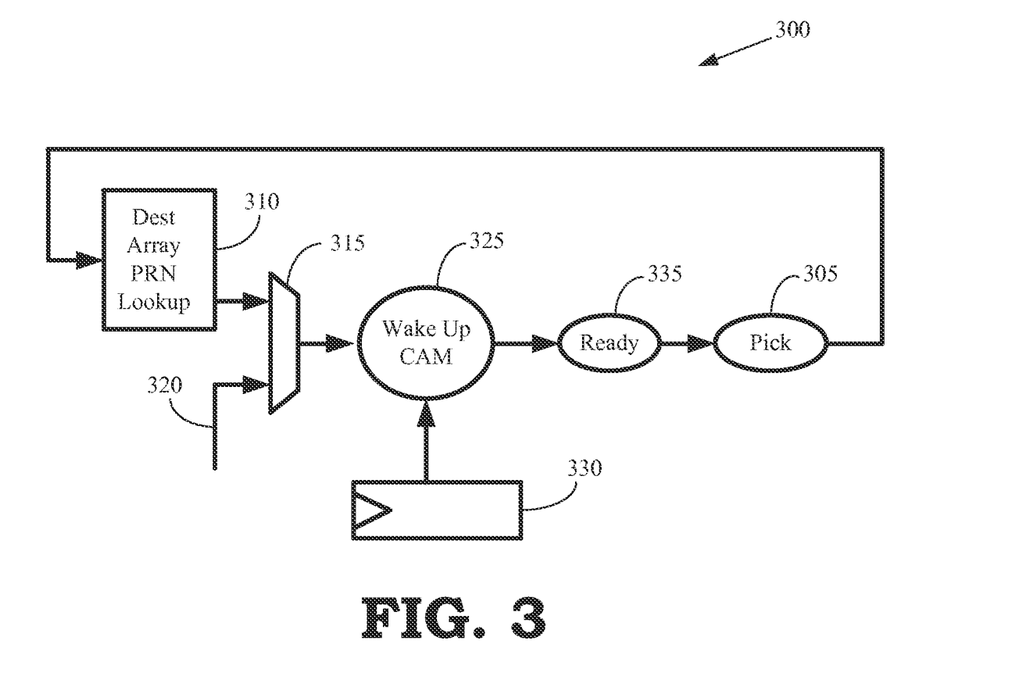
FIG. 3 is a block diagram of a scheduler of FIG. 2, according to some embodiments.

FIG. 3 illustrates a first example scheduler 300, according to some embodiments. The scheduler 300 includes pick logic 305 that is used to pick instructions in the entries of the scheduler 300 for execution. Once the pick logic 305 picks an instruction, the pick logic 305 generates a tag that includes a read address that identifies a memory location that holds physical register numbers (PRN) of destination registers associated with the picked instruction. For example, the pick logic 305 may transmit a scheduler entry identifier to destination array PRN lookup logic 310. The logic 310 may use the provided information to identify a memory location that holds the PRN and may then read out the PRN of the destination register. The PRN may then be provided to the multiplexer 315, which is used to merge PRNs of older instructions 320 with the PRNs generated by the logic 310. The PRN output from the multiplexer 315 can then be broadcast to content-addressable memory (CAM) 325 associated with the entries in the scheduler 300. The CAM 325 associated with each scheduler entry can store tags 330 that indicate PRNs of the source registers for each entry. Ready logic 335 can mark source registers associated with tags 330 that match the broadcast PRN as ready to be executed and entries that have all their source registers marked as ready may subsequently be picked by the pick logic 305.

Figure 4:
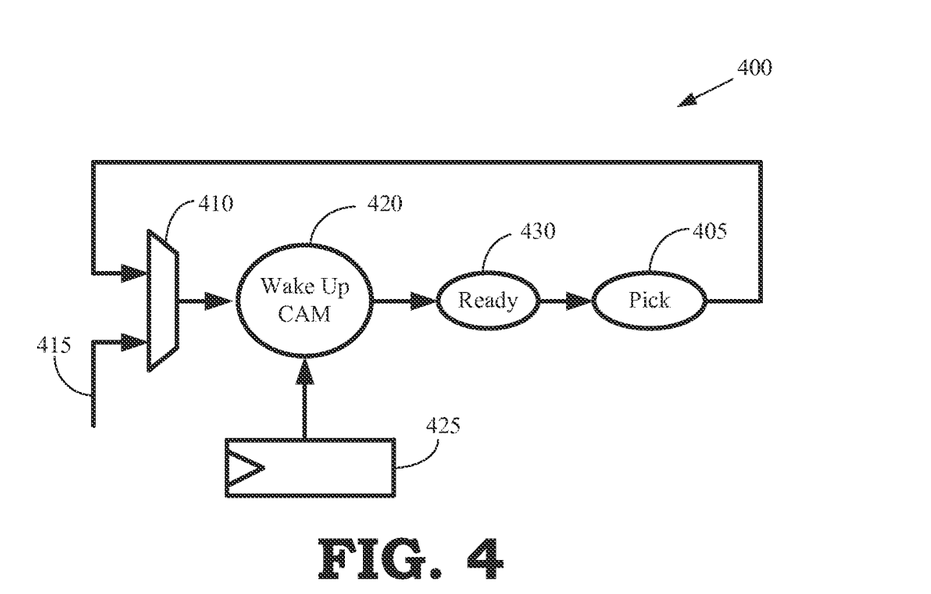
FIG. 4 is a block diagram of a scheduler of FIG. 2, according to some embodiments.

FIG. 4 illustrates a second example scheduler 400, according to some embodiments. The scheduler 400 includes pick logic 405 that is used to pick instructions in the entries of the scheduler 400 for execution. Once the pick logic 405 picks an instruction, the pick logic 405 generates a tag that includes information identifying the picked scheduler entry and information indicating that the tag is a scheduler entry type of tag. The multiplexer 410 is used to merge tags including PRNs of other instructions 415 with the tags generated by the pick logic 405. For example, the multiplexer 410 may allow the injection of tags from completing instructions that are not currently in the scheduler to wake children in the scheduler array. Examples of such instructions include, but are not limited to, results from load instructions, store instructions, or long latency instructions such as divides instructions that may have been removed from the scheduler 400 before they were complete and thus may no longer have a QID to broadcast. The merged tags 415 may also include information identifying the tags 415 as PRN-type tags so that they can be distinguished from the scheduler entry type tags at the CAM 420. The tag output from the multiplexer 410 can then be broadcast to CAM 420, which is associated with the entries in the scheduler 400. The CAM 420 associated with each scheduler entry can store tags 425 that indicate either scheduler entry identifiers or PRNs of the source registers for each entry. The tag 425 also includes information identifying the type of the tag so that they can be compared to the broadcast tags. Ready logic 430 can mark source registers associated with tags 425 that match the broadcast tag as ready to be executed and entries that have all their source registers marked as ready may subsequently be picked by the pick logic 405.

Figure 5:
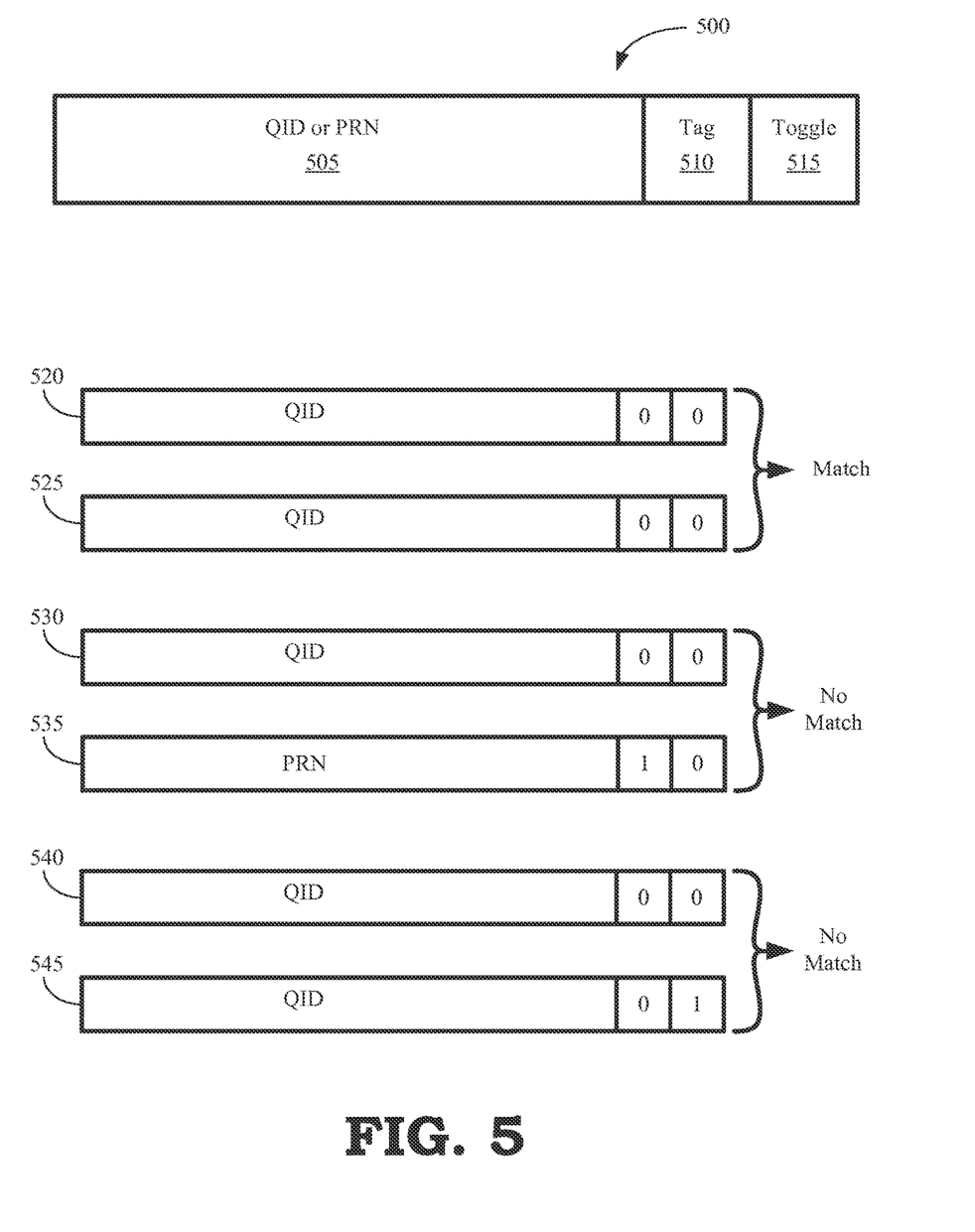
FIG. 5 is a diagram of exemplary tags and comparisons of exemplary tags at the processor core of FIG. 2, according to some embodiments.

FIG. 5 illustrates exemplary tags and comparisons of exemplary tags, according to some embodiments. Tag 500 includes a first portion 505 that stores information such as bits that represent a scheduler entry identifier (QID) or a physical register number (PRN) that is associated with a source register or a destination register for an instruction. The tag 500 also includes a second portion 510 that includes information used to identity the type of the tag 500. For example, if the tag 500 can represent either a QID or a PRN, then a single bit can be used to identify the type as either QID (tag bit set to a value 1) or PRN (tag bit set to a value 0). Additional types of tags can be implemented in some embodiments by increasing the number of bits in the second portion 510.

Some embodiments of the tag 500 include a third portion 515 that indicates a toggle state of the tag 500. For example, when pick logic such as the pick logic 405 shown in FIG. 4 broadcasts the tag 500, the toggle bit 515 in the broadcast tag 500 may have a value of 0. Once the tag 500 has been broadcast, a value of the toggle bit 515 stored in a register may be toggled to change the value of the toggle bit. If the pick logic broadcasts the same tag 500 again, the inverted value of the toggle bit is read out of the register and transmitted with the tag 500. The value of the toggle bit 515 stored in the CAM for each scheduler entry is not toggled in response to detecting the broadcast tag 500. Consequently, the CAM may detect a match the first time the tag 500 is broadcast with the toggle bit of 0 but not the second time the tag 500 is broadcast with the toggle bit of 1. Thus, a new instruction that allocates to the same scheduler entry and gets picked may broadcast the same tag (because it has the same QID) but the toggle bit 515 would be flipped. The previous scheduler entry would match the QID value 505 but the toggle bit 515 would be different. This indicates an aliasing case and some embodiments of the comparators may then turn off from that point onward for that scheduler entry. The toggle bit 515 is only toggled in response to the pick logic broadcasting the tag 500 associated with the scheduler entry. If the tag 500 is not broadcast but the toggle bit 515 gets toggled, then an aliasing tag could match when another instruction in the same scheduler entry is picked for execution because the toggle bit 515 matches. Some embodiments may address aliasing by re-broadcasting the tag for a parent instruction on a different bus when completion of the parent instruction is known. Comparators on this bus may be allocated to source registers of each entry and may be used to identify the parent instruction as complete. When a parent instruction is identified as complete using signals on the new bus, the comparators for this source may be disabled from matching in the future.

Some examples may be used to illustrate comparisons used to identify matches between tags that are broadcast and tags that are stored in a CAM. The broadcast tag 520 and the CAM tag 525 include the same value of the scheduler entry identifier QID. The tag bits for both tags 520, 525 are set to a value of 0 and the toggle bit for both tags 520, 525 are set to a value of 0. The tags 520, 525 therefore match. The broadcast tag 530 includes the scheduler entry identifier QID and the CAM tag 535 includes a physical register number (PRN). The tag bit for tag 530 is set to a value of 0 to indicate that the tag type is QID and the tag bit for tag 535 is set to a value of 1 to indicate that the tag type is PRN. The toggle bits for both tags 530, 535 are set to a value of 0, Since the tag bits for the tags 530, 535 do not match, the tags 530, 535 do not match even if the values of the QID and PRN should happen to be identical. The broadcast tag 540 and the CAM tag 545 include the same value of the scheduler entry identifier QID. The tag bits for both tags 540, 545 are set to a value of 0 to indicate that the tag type of the tag 540, 545 is QID. However, the toggle bit for the broadcast tag 540 is set to a value of 0 and the toggle bit for the CAM tag 545 is set to a value of 1. The different values of the toggle bits may indicate an aliasing condition and therefore the tags 540, 540 do not match.

Figure 6:
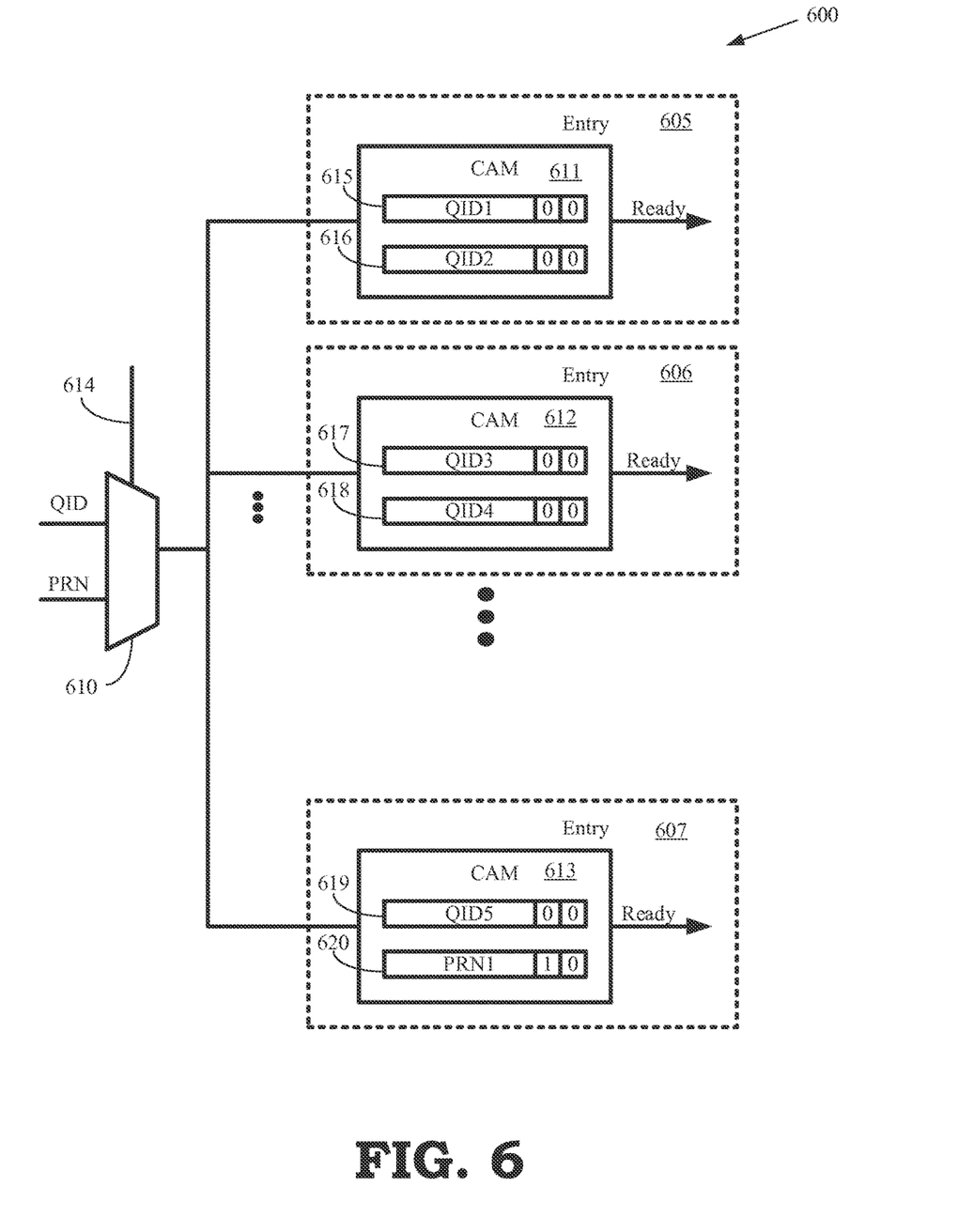
FIG. 6 is a block diagram of a scheduler queue that can receive broadcast values of tags, according to some embodiments.

FIG. 6 illustrates an example scheduler queue 600 that can receive broadcast values of tags, according to some embodiments. The scheduler queue 600 may be implemented in embodiments of the scheduler 500 shown in FIG. 5 or the scheduler 218 shown in FIG. 2. The scheduler queue 600 includes logic associated with entries 605-607. A multiplexer 610 can receive different types of tags such as QID tags or PRN tags, as discussed herein. A select signal 614 can be used to select one of the inputs to the multiplexer 610 and the output may be broadcast to the logic associated with the entries 605-607. The entries 605-607 include comparators such as the content addressable memories (CAM) 611-613 shown in FIG. 6.

Tags 615-620 associated with the source registers for entries 605-607 are stored in the CAMs 611-613. Although two tags 615-620 are shown in each of the entries 605-607, persons of ordinary skill in the art having benefit of the present disclosure should appreciate that different entries may include more or fewer tags 615-620 depending on the number of source registers referenced by the instruction that has been allocated to the corresponding entry 605-607. When one of the CAMs 611-613 detects a match between a broadcast value of a tag received from the multiplexer 610 and one of the stored tags 615-620, the corresponding CAM 611-613 provides a "Ready" signal that indicates that a source register corresponding to the matched tag 615-620 is ready to be accessed during execution of the corresponding instruction. The entries 605-607 may be marked as ready to be executed when all of the source registers have been marked as ready to be accessed during execution.

Figure 7:
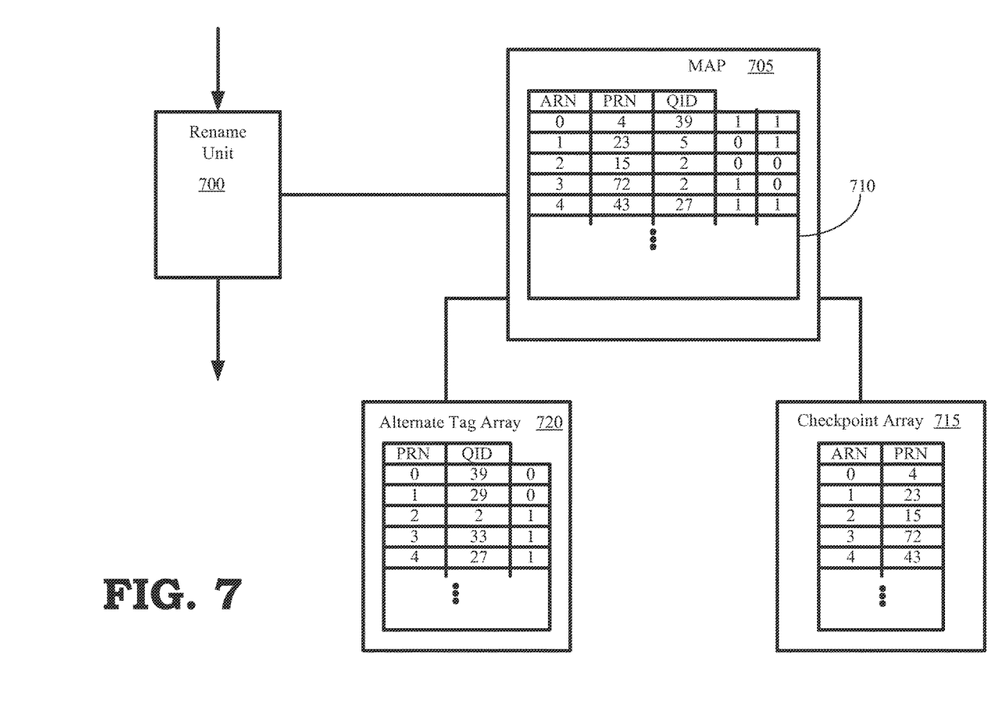
FIG. 7 is a diagram of a rename unit and mapping logic that can be used to checkpoint an architectural state of a processor core such as the processor core shown in FIG. 2, according to some embodiments.

FIG. 7 illustrates an example rename unit 700 and mapping logic 705 that can be used to checkpoint an architectural state of a processor core such as the processor core 200 shown in FIG. 2, according to some embodiments. The mapping logic 705 includes a table 710. Entries in the table 710 include an architectural register number (ARN), a physical register number (PRN) for the physical register that is allocated to the architectural register ARN, a scheduler entry identifier (QID) that identifies the scheduler entry allocated to the architectural register ARN, a tag type bit, and a toggle bit. For example, architectural register 0 has been allocated physical register 4 and scheduler entry 39. The tag type has been set to 1 and the toggle bit has been set to 1. The rename unit 700 can modify these values as necessary and can use the entries in the table 710 to track the mapping of the architectural registers to physical registers or scheduler entries.

The state of the architectural registers is represented by the values stored in the table 710. Some embodiments of processor cores may implement speculative execution of instructions and so the values stored in the table 710 may be speculative values that may not represent the actual state of the machine. For example, if a branch prediction unit predicted the wrong branch following a branch instruction, the speculative values may need to be rolled back to the state of the machine prior to the branch instruction. The values stored in the table 710 may therefore be checkpointed. The mapping logic 705 may be coupled to a checkpoint array 715 that can be used to store information representing a mapping of the architectural registers to the physical registers. The mapping logic 705 may also be coupled to an alternate tag array 720 that is used to store a mapping of the physical registers to scheduler entries and values of the tag type. The checkpoint array 715 and alternate tag array 720 may capture the checkpointed values at any point in time such as just prior to a branch instruction. In some embodiments, entries may be written to the alternate tag array 720 as instructions are dispatched to the scheduler. For example, as an instruction is dispatched, the alternate tag information QID for the instruction may be written at index Px of the alternate tag array 720. When the instruction completes, the alternate tag array 720 may be written again in a manner to indicate that the tag type bit should be flipped.

To roll back the state of the architectural registers, e.g. in response to a mis-speculation, the mapping logic 705 may first recover the mapping of architectural registers to physical registers from the checkpoint array 715. The mapping of architectural registers to the other checkpointed values may then be recovered from the alternate tag array 720. For example, the values of the PRNs recovered from the checkpoint array 715 may be used as indices to access the alternate tag array 720 and recover the corresponding values of the QID and tag type bit. Some embodiments may set the tag type bit to point to a different type of tag such as the PRN type, implying that the alternate tag may no longer be relevant.

Figure 8:
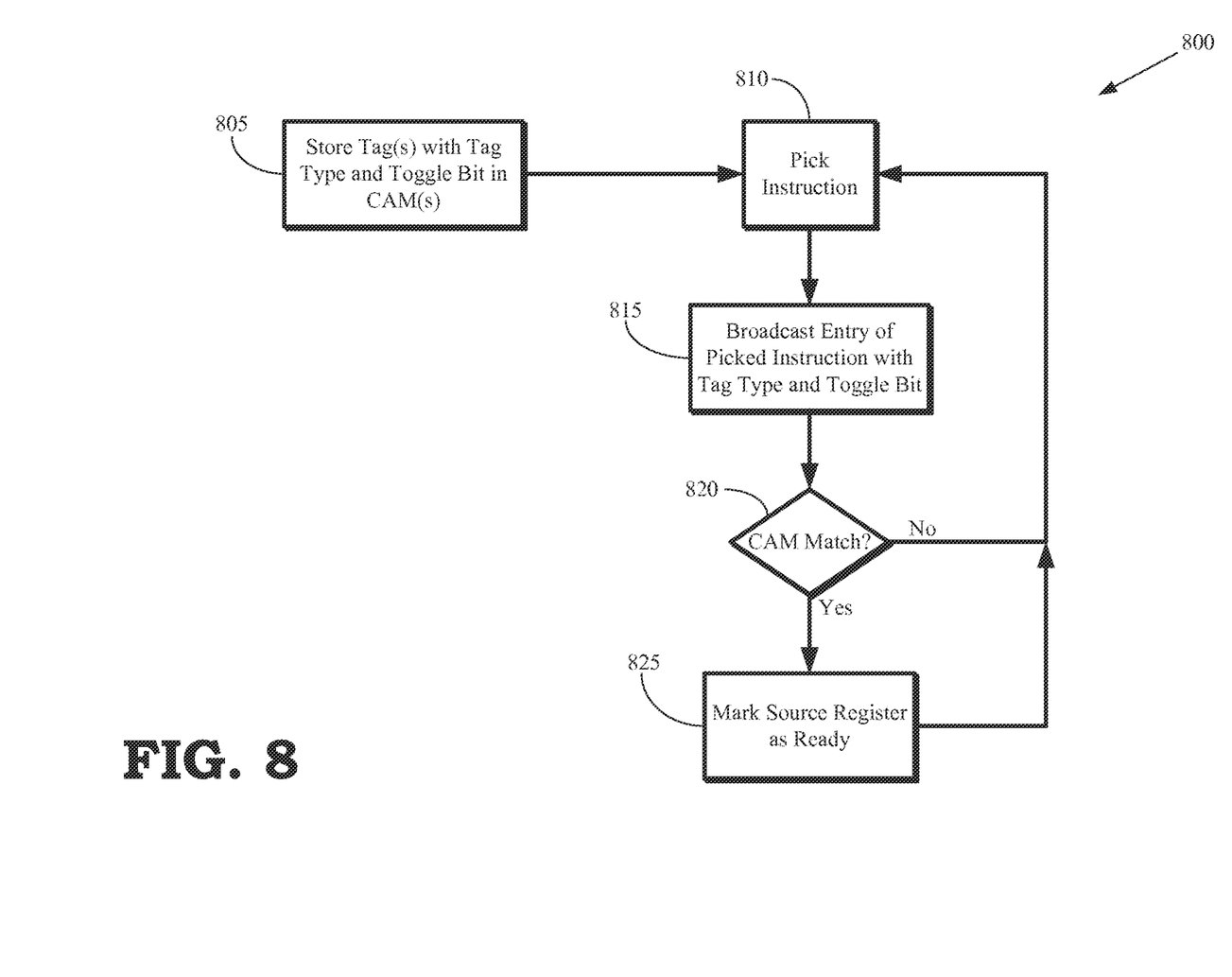
FIG. 8 illustrates a flow diagram of a method of operating a tag-based scheduler, according to some embodiments.

FIG. 8 illustrates an example method 800 of operating a tag-based scheduler, according to some embodiments. At block 805, a scheduler such as the scheduler 218 shown in FIG. 2 may store tags in comparators associated with entries in a queue in the scheduler. The tags include information identifying the tag type and a toggle bit. Some embodiments of the comparators may be implemented as CAMs such as the CAMs 611-613 shown in FIG. 6. At block 810, the scheduler picks an instruction from an entry in the queue for execution in the pipeline. At block 815, pick logic in the scheduler broadcasts a tag identifying the entry associated with the picked instruction. The tag includes the tag type and some embodiments of the tag include a toggle bit. The CAMs associated with each entry in the scheduler receive the broadcast tag and, at block 820, compare the broadcast tag to tags stored in the CAM. At block 825, the source register is marked as ready to be executed if the broadcast tag matches a tag associated with one of the source registers in an entry. The scheduler may then proceed to pick one or more additional instructions including any instructions that have become ready to be executed as a result of their source registers being marked ready.

Figure 9:
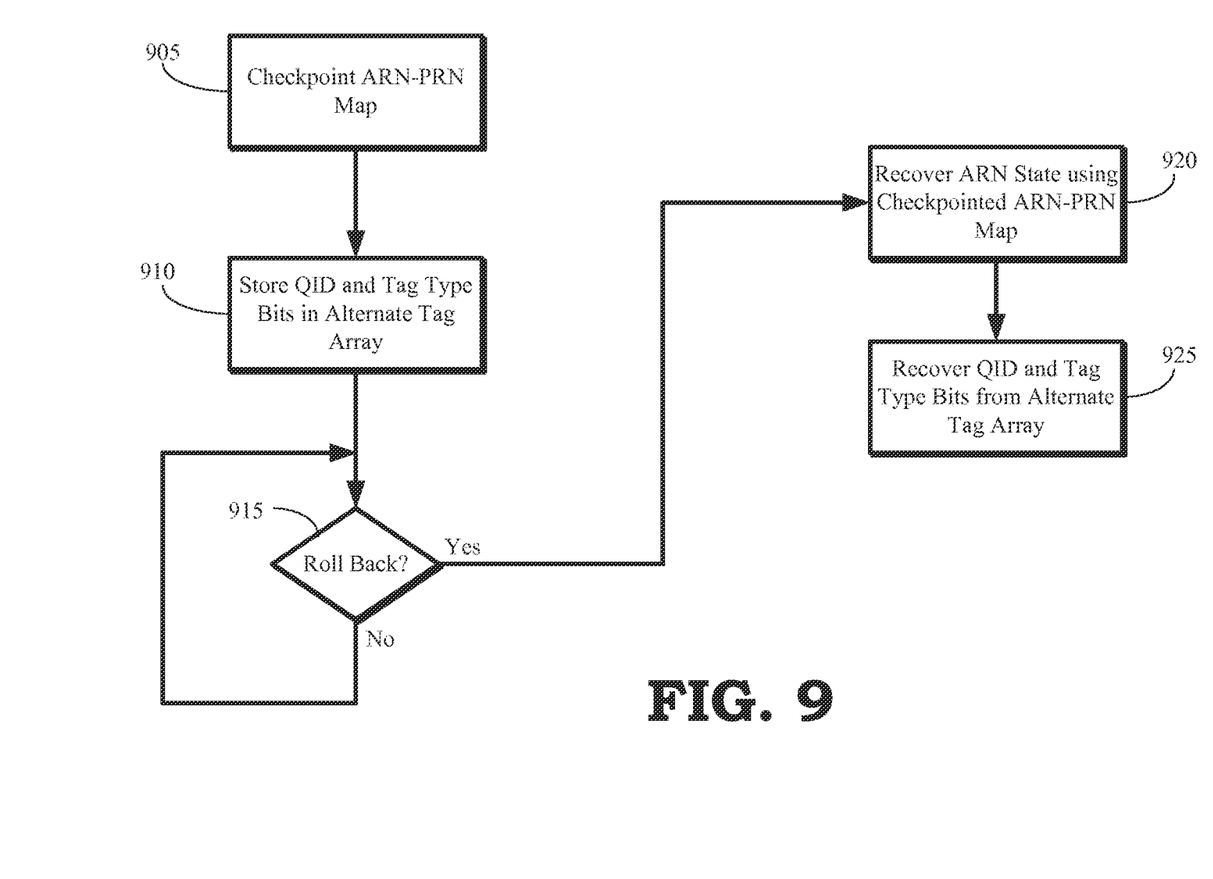
FIG. 9 illustrates a flow diagram of a method for checkpointing an architectural state of a processor that implements tag-based scheduling, according to some embodiments.

FIG. 9 illustrates an example method 900 for checkpointing an architectural state of a processor that implements tag-based scheduling, according to some embodiments. At block 905, a map of the relationships between architectural registers and their allocated physical registers is checkpointed. For example, a table including entries for each architectural register and its assigned physical register may be stored in a checkpoint array such as the checkpoint array 715 shown in FIG. 7. At block 910, information identifying scheduler entries allocated to the architectural registers and the bits indicating the tag type associated with the architectural register are stored in an alternate tag array such as the alternate tag array 720 shown in FIG. 7. At block 915, a processor core such as the processor core 200 shown in FIG. 2 determines whether the architectural state of the processor core is to be rolled back. If so, the architectural state may be recovered (at block 920) using the checkpointed values stored in the checkpoint array. The additional information identifying the scheduler entries and the tag type associated with the architectural registers may then be recovered (at block 925) using the physical register numbers as an index into the alternate tag array.

Figure 10:
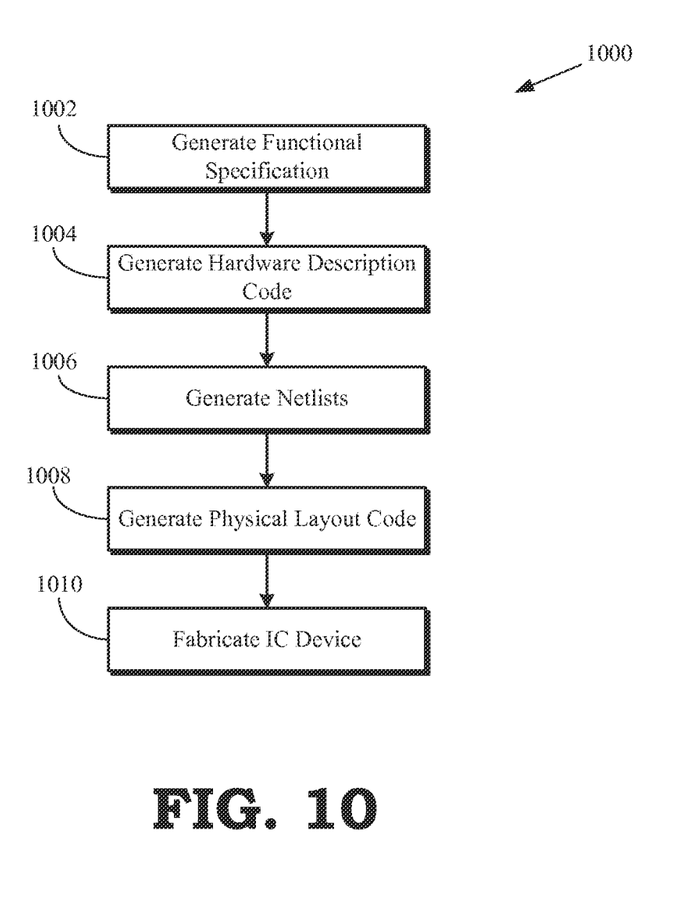
FIG. 10 is a flow diagram illustrating an example method for the design and fabrication of an IC device implementing one or more aspects, according to some embodiments.

FIG. 10 is a flow diagram illustrating an example method 1000 for the design and fabrication of an IC device implementing one or more aspects, according to some embodiments. As noted above, the code generated for each of the following processes is stored or otherwise embodied in computer readable storage media for access and use by the corresponding design tool or fabrication tool.

At block 1002 a functional specification for the IC device is generated. The functional specification (often referred to as a micro architecture specification (MAS)) may be represented by any of a variety of programming languages or modeling languages, including C, C++, SystemC, Simulink, or MATLAB.

At block 1004, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1006 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1008, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1010, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored on a computer readable medium that, when executed by the one or more processors, manipulate the one or more processors to perform one or more aspects of the techniques described above. The software is stored or otherwise tangibly embodied on a computer readable storage medium accessible to the processing system, and can include the instructions and certain data utilized during the execution of the instructions to perform the corresponding aspects.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within scope of the disclosed subject matter. Accordingly, the protection sought herein is as set forth in the claims below.

What is claimed is:

1. A method, comprising:
   broadcasting a first tag to entries in a queue of a scheduler in response to a first instruction associated with a first entry in the queue being picked for execution, and wherein the first tag comprises a plurality of bits identifying the first entry and at least one bit indicating a type of the first tag; and
   marking at least one second entry in the queue as ready to be picked for execution in response to at least one second tag associated with at least one second entry in the queue matching the first tag.

2. The method of claim 1, wherein broadcasting the first tag comprises broadcasting, directly to entries in the queue, a scheduler entry identifier represented by the plurality of bits and at least one bit having a value that indicates that the type of the first tag is a scheduler entry tag that includes information identifying the first entry in the queue.

3. The method of claim 2, wherein broadcasting the first tag comprises broadcasting the first tag from pick logic in the scheduler to a content-addressable memory associated with the entries in the scheduler, wherein the content-addressable memory provides a ready signal in response to tags associated with the entries matching the first tag.

4. The method of claim 1, comprising marking as ready at least one source register for at least one second instruction associated with said at least one second entry in response to said at least one second tag matching the first tag.

5. The method of claim 4, comprising marking as ready said at least one second instruction in response to marking as ready all source registers for said at least one second instruction.

6. The method of claim 4, wherein the first entry is associated with a toggle bit, and wherein the value of the toggle bit is changed in response to the first instruction being picked for execution and the first tag being broadcast, and wherein marking as ready said at least one source register for said at least one second instruction comprises marking as ready said at least one source register in response to at least one toggle bit associated with said at least one second entry matches the toggle bit associated with the first entry.

7. The method of claim 1, comprising checkpointing information identifying relationships between architectural registers and physical registers for entries in the queue to a first array, and checkpointing information identifying relationships between the physical registers and tags of entries in the queue to a second array.

8. The method of claim 7, comprising recovering checkpointed values of the physical registers and tags associated with the architectural registers.

9. The method of claim 1, wherein broadcasting the first tag comprises broadcasting a physical register number represented by the plurality of bits and at least one bit having a value that indicates that the type of the first tag is a physical register tag.

10. An apparatus, comprising:
    a scheduler configured to broadcast a first tag to entries in a queue of the scheduler, wherein the first tag is broadcast in response to the scheduler picking a first instruction associated with a first entry in the queue for execution, and wherein the first tag comprises a plurality of bits identifying the first entry and at least one bit indicating a type of the first tag; and
    at least one comparator configured to signal that at least one second entry in the queue is ready to be picked for execution in response to at least one second tag associated with at least one second entry in the queue matching the first tag.

11. The apparatus of claim 10, wherein the scheduler comprises pick logic configured to pick the first instruction for execution and broadcast, directly to entries in the queue, a plurality of bits representing a scheduler entry identifier that includes information identifying the first entry in the queue and at least one bit having a value that indicates the type of the first tag is a scheduler entry tag.

12. The apparatus of claim 11, wherein said at least one comparator comprises content-addressable memory associated with the entries in the scheduler, and wherein the pick logic is configured to broadcast the first tag to the content-addressable memory and the content-addressable memory is configured to generate a signal indicating whether tags associated with the entries match the first tag.

13. The apparatus of claim 10, wherein entries in the scheduler are configured to store information identifying source registers of instructions, and wherein the scheduler is configured to mark as ready at least one source register for at least one second instruction associated with said at least one second entry in response to said at least one second tag matching the first tag.

14. The apparatus of claim 13, wherein the scheduler is configured to mark as ready said at least one second instruction in response to marking as ready all source registers for said at least one second instruction.

15. The apparatus of claim 13, wherein the first entry is associated with a toggle bit, and wherein the scheduler is configured to change the value of the toggle bit in response to the first instruction being picked for execution and the first tag being broadcast, and wherein the scheduler is configured to mark as ready said at least one source register for at least one second instruction associated with said at least one second entry in response to at least one toggle bit associated with said at least one second entry matching the toggle bit associated with the first entry.

16. The apparatus of claim 10, comprising:
    a first array for checkpointing information identifying relationships between architectural registers and physical registers for entries in the queue; and
    a second array for checkpointing information identifying relationships between the physical registers and tags of entries in the queue.

17. The apparatus of claim 16, wherein the scheduler is configured to recover checkpointed values of the physical registers and tags associated with the architectural registers from the first array and the second array.

18. The apparatus of claim 10, wherein the scheduler is configured to broadcast a plurality of bits representing a physical register number and at least one bit having a value that indicates the type of the first tag is a physical register tag to said at least one comparator.

19. A non-transitory computer readable medium including instructions that when executed configure a manufacturing process used to manufacture a semiconductor device comprising:
    a scheduler configured to broadcast a first tag to entries in a queue of the scheduler, wherein the first tag is broadcast in response to the scheduler picking a first instruction associated with a first entry in the queue for execution, and wherein the first tag comprises a plurality of bits identifying the first entry and at least one bit indicating a type of the first tag; and at least one comparator configured to signal that at least one second entry in the queue is ready to be picked for execution in response to at least one second tag associated with at least one second entry in the queue matching the first tag.

20. The non-transitory computer readable medium set forth in claim 19, wherein the semiconductor device further comprises pick logic and at least one comparator comprising content-addressable memory associated with the entries in the scheduler, and wherein the pick logic is configured to broadcast the first tag to the content-addressable memory and the content-addressable memory is configured to generate a signal indicating whether tags associated with the entries match the first tag.

* * * * *